United States Patent
Kim et al.

(10) Patent No.: US 8,874,179 B2
(45) Date of Patent: Oct. 28, 2014

(54) MOBILE TERMINAL

(71) Applicant: LG Electronics Inc., Seoul (KR)

(72) Inventors: Mintae Kim, Seoul (KR); Hyoungwook Lim, Seoul (KR); Changyong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 13/777,773

(22) Filed: Feb. 26, 2013

(65) Prior Publication Data

US 2013/0225247 A1    Aug. 29, 2013

(30) Foreign Application Priority Data

Feb. 27, 2012 (KR) .................. 10-2012-0019862

(51) Int. Cl.
*H04M 1/00* (2006.01)

(52) U.S. Cl.
USPC .............. 455/575.1; 455/556.1; 455/569; 455/558

(58) Field of Classification Search
CPC .............. H04M 2250/00; H04M 2250/14; H04M 1/0202
USPC ........ 455/575, 556.1, 558, 569; 235/486, 441
See application file for complete search history.

(56) References Cited

U.S. PATENT DOCUMENTS

| | | | |
|---|---|---|---|
| 2004/0082210 A1 | 4/2004 | Wallace et al. | |
| 2004/0125553 A1* | 7/2004 | Castell et al. | 361/683 |
| 2007/0060198 A1 | 3/2007 | Kuo | |
| 2009/0002933 A1 | 1/2009 | Hubert et al. | |
| 2010/0068937 A1 | 3/2010 | Chen | |

FOREIGN PATENT DOCUMENTS

| | | | |
|---|---|---|---|
| CN | 201035460 Y | * | 3/2008 |
| CN | 201750171 U | * | 2/2011 |
| EP | 1916776 | | 4/2008 |
| JP | H10154210 | | 6/1998 |
| JP | 20100519876 | | 6/2010 |

OTHER PUBLICATIONS

European Patent Office Application Serial No. 13155866.0, Search Report dated Jun. 24, 2013, 9 pages.
Japan Patent Office Application Serial No. 2013-035819, Office Action dated Dec. 11, 2013, 3 pages.

* cited by examiner

*Primary Examiner* — David Q Nguyen
(74) *Attorney, Agent, or Firm* — Lee, Hong, Degerman, Kang & Waimey

(57) ABSTRACT

A mobile terminal is provided. The mobile terminal includes a body, a case and a label plate. The body has a socket into which an external device may be inserted. The case may be formed to cover the body. The label plate may have a label formed on one surface of the label plate and containing information that identifies a product. The label plate may be configured to slide in and out of a space located between the socket and the case. The label on the label plate may be exposed when the label plate slides out of the space. Alternatively, the label may be covered when the label plate slides in the space. The label may be a product identification label ("PID label"). The PID label may be a unique label that can confirm that the mobile terminal was manufactured by a particular company.

18 Claims, 17 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2012-0019862, filed on Feb. 27, 2012, the contents of which is hereby incorporated by reference herein in its entirety.

FIELD OF THE INVENTION

1. Field of the Invention

The present disclosure relates to a label plate that is mounted onto a mobile terminal.

2. Description of Related Art

A terminal may be implemented as a multimedia player having complex functions, such as taking photos and/or videos, playing music and/or video files, playing games, receiving a broadcast, and other similar functions. A terminal may be mobile or stationary. A mobile terminal is a portable device that can be carried anywhere and may facilitate voice and video calls, input and/or output information, store data, and perform other similar functions.

A product identification label ("PID label") may be attached to a mobile terminal. The PID label is a unique label that can confirm that the mobile terminal is a product that was manufactured by a particular company. The PID label may be attached at a conspicuous location such the PID label is exposed to the naked eye when a rear case of the mobile terminal is removed. An location where the PID label is attached may differ depending on the particular mobile terminal.

SUMMARY OF THE INVENTION

A mobile terminal is provided that has a label plate that can be mounted at different positions and has a structure that improves visibility and identification of the label plate.

A mobile terminal may include a body having a socket into which at least one portion of an external device is inserted, a case that covers the body, and a label plate having a label that can be used to identify a product, where the label plate may be configured to slide in and out of a space located between the socket and the case.

In some exemplary embodiments, the socket may have an insertion hole through which an external device is inserted, and the case may have a through-hole that corresponds to the insertion hole.

In some exemplary embodiments, the label plate may comprise a label portion and a slit portion that extends from the label portion and comprises at least one slit.

In some exemplary embodiments, the socket may include a guide portion for guiding the label plate when the label plate is inserted.

In some exemplary embodiments, the guide portion may be bent so that a portion of the guide portion extends toward the slit portion.

In some exemplary embodiments, the case may have a stopper that protrudes toward the slit portion.

In some exemplary embodiments, the slit portion may comprise a pair of slits.

In some exemplary embodiments, the case may include a support portion that is formed to limit or prevent movement of the label plate by pressing against the slit portion when the label plate is inserted.

In some exemplary embodiments, a portion of the support portion that presses against the slit portion may be composed of a rubber material.

In some exemplary embodiments, the label portion may also include projections that protrude from a surface of the label portion, and the socket may include grooves into which the projections are inserted.

In some exemplary embodiments, the label plate may comprise a first portion that is closest to the exterior of the mobile terminal when the label plate is inserted as well as a second portion located opposite to the first portion. A knob portion may be formed on the first portion of the label plate, and the knob portion may be used to slide the label plate out.

In some exemplary embodiments, a seam portion having one folded end may be formed at the second portion of the label plate in order to prevent interference by an internal structure of the mobile terminal as the label plate is inserted.

In some exemplary embodiments, a chamfer portion may be formed on the second portion of the label plate in order to prevent interference with the guide portion as the label plate is inserted.

In some exemplary embodiments, a subscriber identity module (SIM) card may be inserted into the socket.

In some exemplary embodiments, the case may include a protruding portion that protrudes from one surface of the case in order to guide the label plate when the label plate is inserted.

In alternative embodiments, a mobile terminal comprises a body that has a socket at one side of the body, the socket configured to receive an external device, a case that covers the one side of the body and has a through-hole through which the socket is exposed, and a label plate comprising a label that is on one surface of the label plate and contains identification information about a product, wherein the mobile terminal is in a first state when the label is not inserted into the through-hole and the label is exposed, and wherein the mobile terminal is in a second state when the label plate is inserted into the through-hole and the label is covered.

In some exemplary embodiments, the mobile terminal may include a hole cover that is coupled to the case and configured to open and close the through-hole of the case.

In some exemplary embodiments, the socket comprises a first hole into which the external device is inserted and a second hole into which the label plate is inserted.

In some exemplary embodiments, the socket comprises at least one guide slit that is formed to guide the label plate when the label plate is inserted into the second hole.

In some exemplary embodiments, the label plate comprises a label portion comprising the label and is formed on one surface of the label plate, and an extending portion that extends from the label portion and comprises a guide projection that is coupled to the at least one guide slit.

In some exemplary embodiments, the label plate comprises a stopper that protrudes from the label plate and is configured to be inserted into an opening of the socket in order to stop movement of the inserted label plate.

It will be understood that the detailed description provided herein, while indicating certain embodiments, is given by way of illustration only, since many changes and modifications will be apparent to those of ordinary skilled in the relevant and can be implemented while staying within the scope of the present invention.

BRIEF DESCRIPTION OF THE DRAWINGS

The accompanying drawings illustrate certain exemplary embodiments. In the drawings.

DETAILED DESCRIPTION OF EXEMPLARY EMBODIMENTS

Mobile terminals will be described in more detail and with reference to the enclosed drawings. Any suffixes attached to disclosed components, such as 'module,' 'unit,' or 'portion' are used for facilitation of the detailed description of the present disclosure. Such suffixes do not have different meanings from each other.

Mobile terminals described herein may include a portable phone, a smart phone, a laptop computer, a digital broadcasting terminal, a Personal Digital Assistant (PDA), a Portable Multimedia Player (PMP), a navigation system, and/or any other similar device. However, it will be known to those skilled in the relevant art that the present invention may also be applicable to a fixed or stationary terminal, such as a digital television (TV), a desktop computer, or other similar device.

Figure 1:
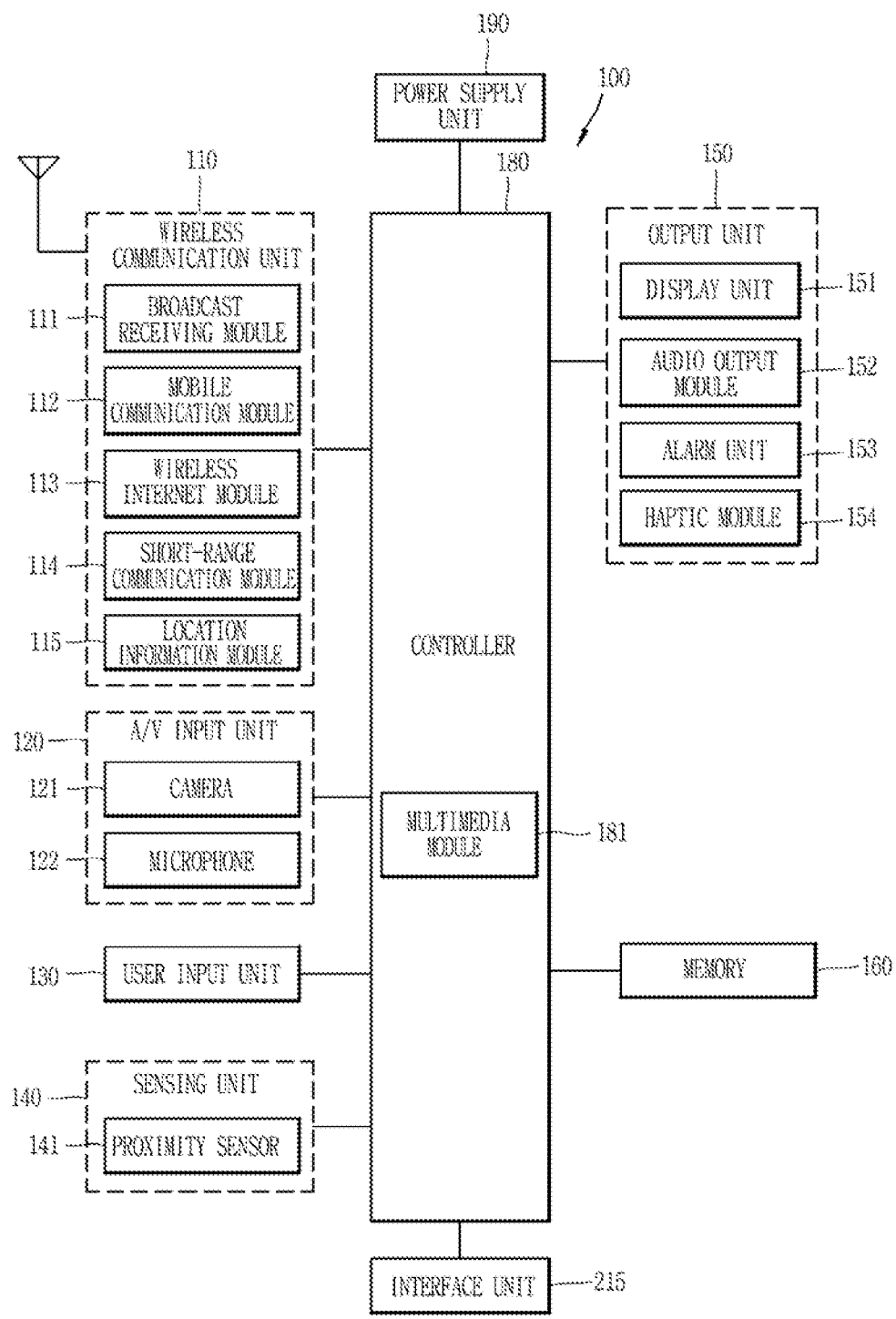
FIG. 1 is an exemplary block configuration of an exemplary mobile terminal of the present invention.

With respect to FIG. 1, the mobile terminal 100 may comprise a wireless communication unit 110, an Audio/Video (AN) input unit 120, a user input unit 130, a sensing unit 140, an output unit 150, a memory 160, an interface unit 215, a controller 180, a power supply unit 190, and other similar components. FIG. 1 shows the mobile terminal 100 having various components, but it will be understood that implementing all of the illustrated components is not a requirement of the present invention. Additional or fewer components may be implemented without deviating from the scope of the present invention.

The wireless communication unit 110 may include one or more components configured for wireless communication between the mobile terminal 100 and a wireless communication system (not shown) and/or between the mobile terminal and a network (not shown) within which the mobile terminal is located. For example, the wireless communication unit may include a broadcast receiving module 111, a mobile communication module 112, a wireless Internet module 113, a short-range communication module 114, a location information module 115 and other similar components.

The broadcast receiving module 111 receives broadcast signals and/or broadcast-associated information from an external broadcast management server (not shown) via a broadcast channel. The broadcast channel may include a satellite channel and/or a terrestrial channel. The broadcast management server may be a server that generates and/or transmits a broadcast signal and/or broadcast-associated information. Alternatively, the broadcast management server may be a server that receives a previously-generated broadcast signal and/or broadcast-associated information and/or transmits the previously-generated broadcast signal and/or broadcast-associated information to a mobile terminal 100.

The broadcast-associated information may refer to information associated with a broadcast channel, a broadcast program or a broadcast service-provider. The broadcast signal may include a TV broadcast signal, a radio broadcast signal, a data broadcast signal, and other similar signals. Also, the broadcast signal may be combined with a TV or radio broadcast signal.

The broadcast-associated information may refer to information associated with a broadcast channel, a broadcast program or a broadcast service provider. The broadcast-associated information may be provided via a mobile communication network (not shown). Alternatively, the broadcast-associated information may be received via the mobile communication module 112.

The broadcast signal may exist in the form of an electronic program guide (EPG) of digital multimedia broadcasting (DMB), an electronic service guide (ESG) of digital video broadcast-handheld (DVB-H), and other similar forms of signals.

The broadcast receiving module 111 may be configured to receive signals broadcast by using various types of broadcast systems (not shown). In particular, the broadcast receiving module may receive a digital broadcast by using a digital broadcast system such as a multimedia broadcasting-terrestrial (DMB-T) system, a digital multimedia broadcasting-satellite (DMB-S) system, a digital video broadcast-handheld (DVB-H) system, a media forward link only (MediaFLO®) system, an integrated services digital broadcast-terrestrial (ISDB-T) system, and other similar systems. The broadcast receiving module may be configured to be suitable for any broadcast system that provides a broadcast signal in conjunction with the broadcast system.

Broadcasting signals and/or broadcast-associated information received through the broadcast receiving module 111 may be stored in the memory 160 of the mobile terminal 100.

The mobile communication module 112 may be configured to transmit and/or receive wireless signals to and/or from one or more network entities (e.g., base stations, external terminals, servers, and other similar entities) via a mobile communication network (not shown). The wireless signals may include an audio call signal, a video call signal, or various formats of data related to transmission and/or reception of text and/or multimedia messages.

The wireless Internet module 113 may be configured to support wireless Internet access by the mobile terminal 100. The wireless Internet module may be internally- or externally-coupled to the mobile terminal. Wireless Internet access may be achieved via Wireless Local Area Network (WLAN), Wireless Fidelity (Wi-Fi), Wireless Broadband (Wibro), World Interoperability for Microwave Access (WiMax), High Speed Downlink Packet Access (HSDPA), and other similar methods of obtaining wireless Internet access.

The short-range communication module 114 may be configured for performing short-range communication. Suitable technologies for performing short-range communication may include BLUETOOTH™, Radio Frequency Identification (RFID), Infrared Data Association (IrDA), Ultra-WideBand (UWB) and ZigBee.

The location information module 115 may be configured for sensing and/or calculating a location and/or position of the mobile terminal 100. An exemplary embodiment of the location information module may be a Global Position System (GPS) module.

The A/V input unit 120 may be configured for receiving an audio and/or video signal. The A/V input unit may include a camera 121, a microphone 122, and/or other similar component. The camera may process image data of still pictures and/or video. The processed image frames may be displayed on a display unit 151 of the mobile terminal 100. The frames processed by the camera may be stored in the memory 160 or transmitted via the wireless communication unit 110. The camera may be located in two or more locations of the mobile terminal.

The microphone 122 may receive sounds during a phone call mode, a recording mode, a voice-recognition mode, and/or other similar modes. The microphone may then process the received sounds into audio data. The processed audio data may then be converted and output into a format that can be transmitted to a mobile communication base station (not shown) via the mobile communication module 112 when the mobile terminal 100 is in the phone call mode. The microphone may utilize various types of noise-canceling or noise-suppression algorithms to cancel and/or suppress noise and/or interference generated while receiving and/or transmitting audio signals.

The user input unit 130 may generate key-input data from commands entered by a user during various operations performed by the mobile terminal 100. The user input unit may include a keypad, a dome switch, a touch pad (e.g., a touch-sensitive module that detects changes in resistance, pressure, and/or capacitance when the touch-sensitive module is contacted), a jog wheel, a jog switch, and/or other similar modules.

The sensing unit 140 may be configured to detect a current state of the mobile terminal 100, such as the mobile terminal being in an opened or closed state, a location of the mobile terminal, a presence or an absence of user contact to the mobile terminal, an orientation of the mobile terminal, and/or an acceleration and/or deceleration of movement and/or direction of the mobile terminal.

The sensing unit 140 may also generate commands and/or signals for controlling the operation of the mobile terminal 100. For example, when the mobile terminal configured as a slide-type mobile terminal, the sensing unit may sense whether the slide-type mobile terminal is opened or closed. The sensing unit may also detect whether the power supply unit 190 is supplying power or whether the interface unit 215 is coupled to an external device. The sensing unit may include a proximity sensor 141.

The output unit 150 may be configured to provide outputs in a visual, audible, and/or tactile manner. The output unit may include a display unit 151, an audio output module 152, an alarm unit 153, a haptic module 154, and/or other similar modules.

The display unit 151 may display information processed by the mobile terminal 100. For example, when the mobile terminal is in a phone call mode, the display unit may display a User Interface (UI) or a Graphic User Interface (GUI) that is associated with a call or other communication (e.g., a text message, a multimedia file download, or other similar communication). When the mobile terminal is in a video call mode or image-capturing mode, the display unit may display a captured image, a received image, the UI and/or the GUI.

The display unit 151 may include at least a Liquid Crystal Display (LCD), a Thin Film Transistor LCD (TFT-LCD), an Organic Light Emitting Diode (OLED) display, a flexible display, a three-dimensional (3D) display, or other similar type of display.

The display may be transparent such that an outside area of the mobile terminal 100 may be seen through the body of the mobile terminal. An example of such a transparent display may be a Transparent Organic Light Emitting Diode (TOLED) display.

A rear surface portion of the display unit 151 may be optically-transparent such that a user can view an object positioned at a rear side of a body through a region occupied by the display unit of the mobile terminal 100.

The display unit 151 may be located in two locations of the mobile terminal 100. For instance, a plurality of display units may be arranged on a single surface of the mobile terminal or, alternatively, on different surfaces of the mobile terminal.

If the display unit 151 and a touch-sensitive sensor (not shown) have a layered structure between the display unit and the touch-sensitive sensor, the layered structure may be referred to as a 'touch screen.' The display unit may be used as an input device rather than exclusively an output device. The touch sensor may be a touch film, a touch sheet, a touch pad, and/or any other similar apparatus. The touch sensor may be configured to convert changes in pressure as applied to a specific part of the display unit, or changes in capacitance at a specific part of the display unit, into electric signals. The touch sensor may also be configured to sense an amount of pressure corresponding a touch input.

When touch inputs are sensed by the touch sensors, corresponding electric signals are transmitted to a touch controller (not shown). The touch controller processes the received signals and transmits corresponding data to the controller 180. Accordingly, the controller may determine which region of the display unit 151 has been touched.

A proximity sensor 141 may be located at an inner region of the mobile terminal 100. In some embodiments, the proximity sensor may be blocked by the touch screen or may be near the touch screen. The proximity sensor may comprise a sensor configured to sense a presence and/or an absence of an object approaching a surface of the mobile terminal. The proximity sensor may also be configured to sense an object located near a surface of the mobile terminal by using an electromagnetic field or infrared rays, which do not require actual contact. The proximity sensor typically has a longer lifespan and enhanced utility than a contact sensor.

The proximity sensor 141 may include a transmissive-type photoelectric sensor, a direct reflective-type photoelectric sensor, a mirror reflective-type photoelectric sensor, a high-frequency oscillation proximity-type sensor, a capacitance-type proximity sensor, a magnetic-type proximity sensor, an infrared ray proximity-type sensor, and/or any other similar sensor type. When the touch screen is capacitance-type, a proximity of a pointer to the touch screen is sensed by changes in the electromagnetic field.

The term 'proximity touch' will refer to a state when the pointer is positioned proximate to the touch screen without actually contacting the touch screen. The term 'contact touch' will refer to a state when the pointer actually contacts the touch screen.

The proximity sensor 141 may sense a proximity touch, and proximity touch patterns (including, e.g., a distance, a direction, a speed, a duration, a time, a position, and/or a movement of a proximity touch). Information related to the sensed proximity touch and the sensed proximity touch patterns may be output onto the touch screen.

The audio output module 152 may output audio data received from the wireless communication unit 110. The audio output module may, alternatively, store the received audio data in the memory 160 during a call-reception mode, a call-initiating mode, a recording mode, a voice recognition mode, and/or a broadcast reception mode. Also, the audio output module may output audible sounds related to a particular function performed by the mobile terminal 100 (e.g., a call signal reception sound, a message reception sound, and/or other similar sounds). The audio output module may include a speaker, a buzzer, and/or any other similar components.

The alarm unit 153 may output sounds corresponding to an event associated with the mobile terminal 100. Exemplary events may include call reception, message reception, key signal inputs, a touch input, and other similar events. The alarm unit may also output different sounds for different events. A video signal and/or the audio signal may be output via the display unit 151 or the audio output module 152. Accordingly, the display unit or the audio output module may be a part of the alarm unit.

The haptic module 154 may generate various tactile effects that a user can feel. Exemplary tactile effects generated by the haptic module may include various forms of vibration, which may have a controllable intensity, a controllable pattern, and other characteristics. Vibrations may be output in a synthesized or in a sequential manner.

The haptic module may also vertically move an arrangement of pins that may touch the skin of a user. The haptic module may also perform air injection or air suction through an injection hole or a suction hole of the mobile terminal 100. The haptic module may also use various electrodes to generate an electrostatic force and/or reproduce feelings of cool or heat using a heat-absorbing device or a heat-emitting device.

The haptic module may transmit such tactile effects through a direct contact between the mobile terminal and a user of the mobile terminal. In some embodiment, the mobile terminal may comprise two or more haptic modules.

The memory 160 may store a program for the processing and control the controller 180. The memory may temporarily store input and/or output data (e.g., phonebook data, messages, still images, video and other similar data). Also, the memory may store data related to various patterns of vibration and audio output when a touch input is received on the touch screen.

The memory 160 may be any suitable storage medium, such as a flash memory-type, a hard disk-type, a multimedia card micro-type, a memory card-type (e.g., a SD or a DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, a magnetic disk, an optical disk, and/or any other similar type of data storage component. Also, the mobile terminal 100 may be integrated to work with an Internet-based storage system.

The interface unit 215 may facilitate the interface of the mobile terminal 100 with an external device. The interface unit may allow data reception from an external device, power delivery to each component in the mobile terminal, and/or data transmission from the mobile terminal to the external device. The interface unit may include, for example, wired and/or wireless headset ports, external charger ports, wired and/or wireless data ports, memory card ports, ports for coupling devices having an identification module, audio Input/Output (I/O) ports, video I/O ports, earphone ports, and/or other similar components.

The identification module (not shown) may be configured as a chip for storing information required to authenticate an authority for using the mobile terminal 100. The identification module may include a User Identity Module (UIM), a Subscriber Identity Module (SIM), a Universal Subscriber Identity Module (USIM), and other similar modules. The identification module may be a type of smart card. The identification module may be coupled to the mobile terminal 100 via a port (not shown).

The interface unit 215 may serve as a path for power to be supplied from an external cradle (not shown) to the mobile terminal 100 when the mobile terminal is connected to the external cradle. The interface unit may also be a path for transferring various command signals that are input from the external cradle by a user of the mobile terminal. Various command signals or power inputs from the cradle may operate as signals for recognizing that the mobile terminal has been mounted to the external cradle.

The controller 180 may control operations performed by the mobile terminal 100. For example, the controller may control and process telephone calls, data communications, video calls, and/or any other similar function. The controller 180 may also perform pattern recognition processing in order to recognize writing that is input on the touch screen as text or recognize drawing that is input on the touch screen as an image.

The controller may include a multimedia module 181 that provides multimedia playback. The multimedia module may be configured as part of the controller or as a separate component.

The power supply unit 190 may supply power to each component of the mobile terminal 100 by receiving external power or internal power under the control of the controller 180.

Various embodiments described herein may be implemented in a computer-readable medium using, for example, software, hardware, or some combination of software and hardware.

With respect to hardware, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units that are designed to perform the functions described herein, or a selective combination of the foregoing components. In some embodiments, certain operations may be performed by the controller 180.

With respect to software, the embodiments of procedures and functions as described herein may be implemented using separate software modules, each of which performs at least one function or operation. Software codes can be implemented with a software application written in any suitable programming language. The software codes may be stored in the memory 160 and executed by the controller 180.

Figure 2:
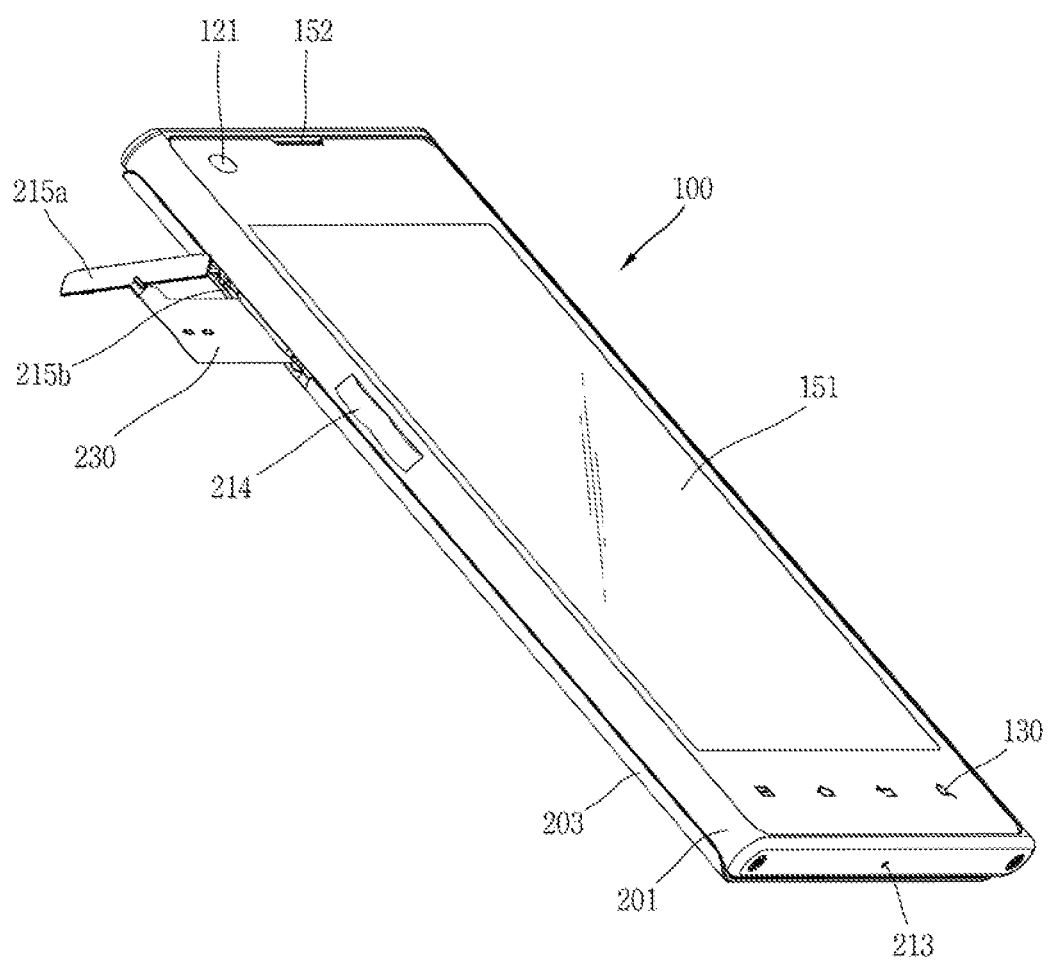
FIG. 2 is a front perspective view of an exemplary mobile terminal of the present invention.
Figure 3A:
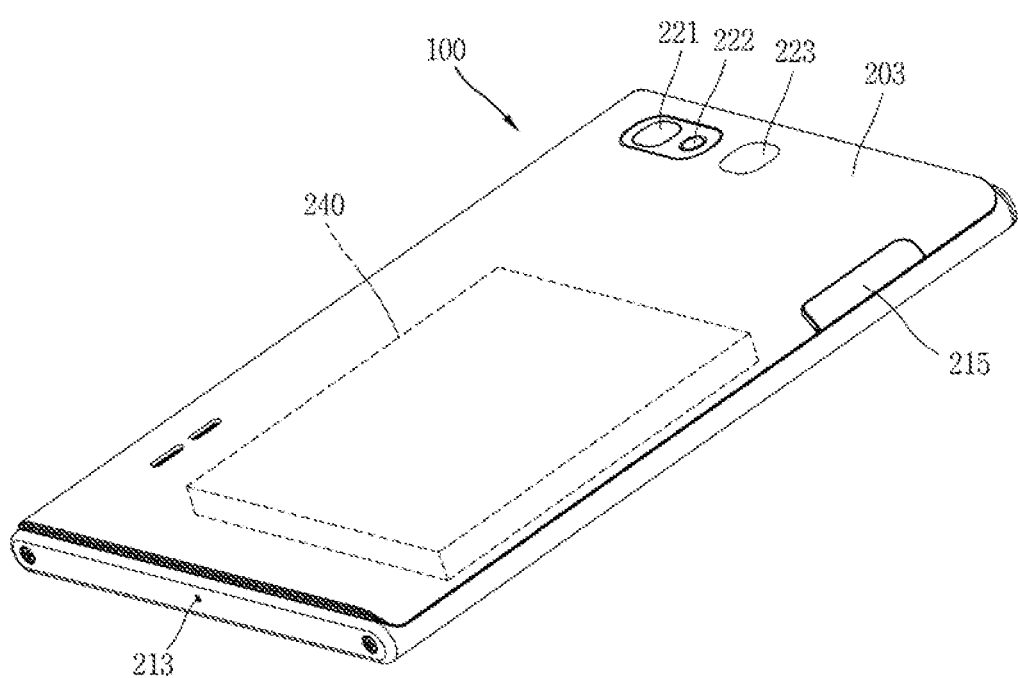
FIGS. 3A and 3B are rear perspective views of the exemplary mobile terminal illustrated in FIG. 2.

FIG. 2 is a front perspective view of an exemplary mobile terminal. FIG. 3A is a rear perspective view of FIG. 2.

With respect to FIGS. 2 and 3A, an exemplary mobile terminal 100 is a bar-type mobile terminal. However, the mobile terminal is not limited to this type; the mobile terminal may also be a slide-type terminal in which two or more bodies are coupled to each other so as to allow movement of a first body relative to a second body, a folder-type motion, a swing-type motion, a swivel-type motion, or any other similar type of motion.

A case (e.g., a casing, a housing or a cover) may form the appearance of a body of the mobile terminal 100. The case may include a front case 201, a rear case 202 (see FIG. 4) that is located opposite to the front case, and a battery cover 203 that is coupled to the rear case. A space formed between the front case and the rear case may accommodate various components. The case of the mobile terminal may consist of injection-molded synthetic resin or metallic materials, such as stainless steel (STS) or titanium (Ti).

The body of the mobile terminal 100 may comprise a display unit 151, an audio output module 152, a camera 121, a side key 214, an interface unit 215, and a user input unit 130.

The display unit 151 may include a liquid crystal display (LCD) module, an organic light emitting diodes (OLED) module, an electronic paper ("e-paper"), or other similar type of display type, each configured for visually displaying information. The display unit includes a display module 210*b* and a window portion 210*a*. (See FIG. 5.)

The display unit 151 may include a touch-sensing component configured for receiving information via a touch input. Once a portion on the touch screen is touched, content corresponding to the touched position is input. The content may include characters, numbers, and/or menu items. The touch sensing component may be transmissive such that the display unit can be viewed, and the display unit may include a structure configured for enhancing a visibility of the touch screen in an environment with bright light. The touch screen occupies most of the front surface of the front case 201.

The audio output module 152 may be a receiver configured for transmitting a call sound to a user's ear or a loud-speaker configured for outputting an alarm sound or playback sounds of multimedia data.

The camera 121 may process frames of still images or video obtained using an image sensor (not shown) during a video call or a video capturing mode. The processed frames may be displayed on the display unit 151.

The processed frames may be stored in the memory 160 and/or may be transmitted via the wireless communication unit 110. The mobile terminal 100 may comprise two or more cameras.

The user input unit 130 is configured to receive a command for controlling operations of the mobile terminal 100. The user input unit may include a plurality of input keys. The input keys may be referred to as manipulation portions and may include any type of input keys that can be manipulated by a user.

In some embodiments, the user input unit 130 may be a dome switch, a touch screen, or a touch pad that is configured for inputting commands or information by a user. Alternatively, the user input unit may be a wheel configured for rotating a key, a jog, and/or a joystick. The user input unit is configured to input various commands, such as START, END and SCROLL.

A side key 214, an interface unit 215, and a microphone 122 may be located on side surfaces of the front case 201.

The side key 214 may be called a 'manipulation unit' and may be configured to receive commands for controlling operations of the mobile terminal 100. The side key may be set to correspond to different content and/or operations of the mobile terminal. The side key may be used to input commands for controlling the camera 121 and/or a rear camera 221 of the mobile terminal. The side key may also be used for controlling a level of sound that is output by the audio output module 152 and/or converting a mode of the display unit 151 into a touch recognition mode.

The interface unit 215 may serve as a path through which the mobile terminal 100 performs data exchange with an external device. For example, the interface unit may be at least a connection terminal configured for headphones, a port for local area communication (e.g., an infrared data association (IrDA) port, a Bluetooth™ port, or a WLAN port), and/or a power supply terminals for supplying power to the mobile terminal. The interface unit may be a card socket configured for accommodating an external card such as a subscriber identification module (SIM) card, a user identity module (UIM) card or a memory card for storing information.

The power supply unit 190 may be a battery 240. The battery 240 and a rear camera 221 may be located on the rear surface of the mobile terminal 100. A flash 222 and a mirror 223 may be located close to the rear camera. When capturing an image of an object using the rear camera, the flash shines light onto the object.

When the user captures an image of himself or herself using the rear camera 221, the mirror 223 may be used for the user to look at himself or herself.

The rear camera 221 may face a direction that is opposite to a direction faced by the camera 121 and may capture images at different pixels relative to pictures captured by the camera. The cameras be configured to rotate or pop-up from the mobile terminal 100.

For example, the camera may captures images with relatively fewer pixels (i.e., at a lower resolution). As such, the camera may be useful when a user wishes to use the camera to capture his or her face and to send that captured image during a video call. The rear camera may capture images with relatively higher pixels (i.e., a higher resolution) such that the rear camera can be used for obtaining higher-quality pictures.

A battery 240 may be mounted in the body or may be detachably mounted to the body of the mobile terminal 100.

Figure 3B:
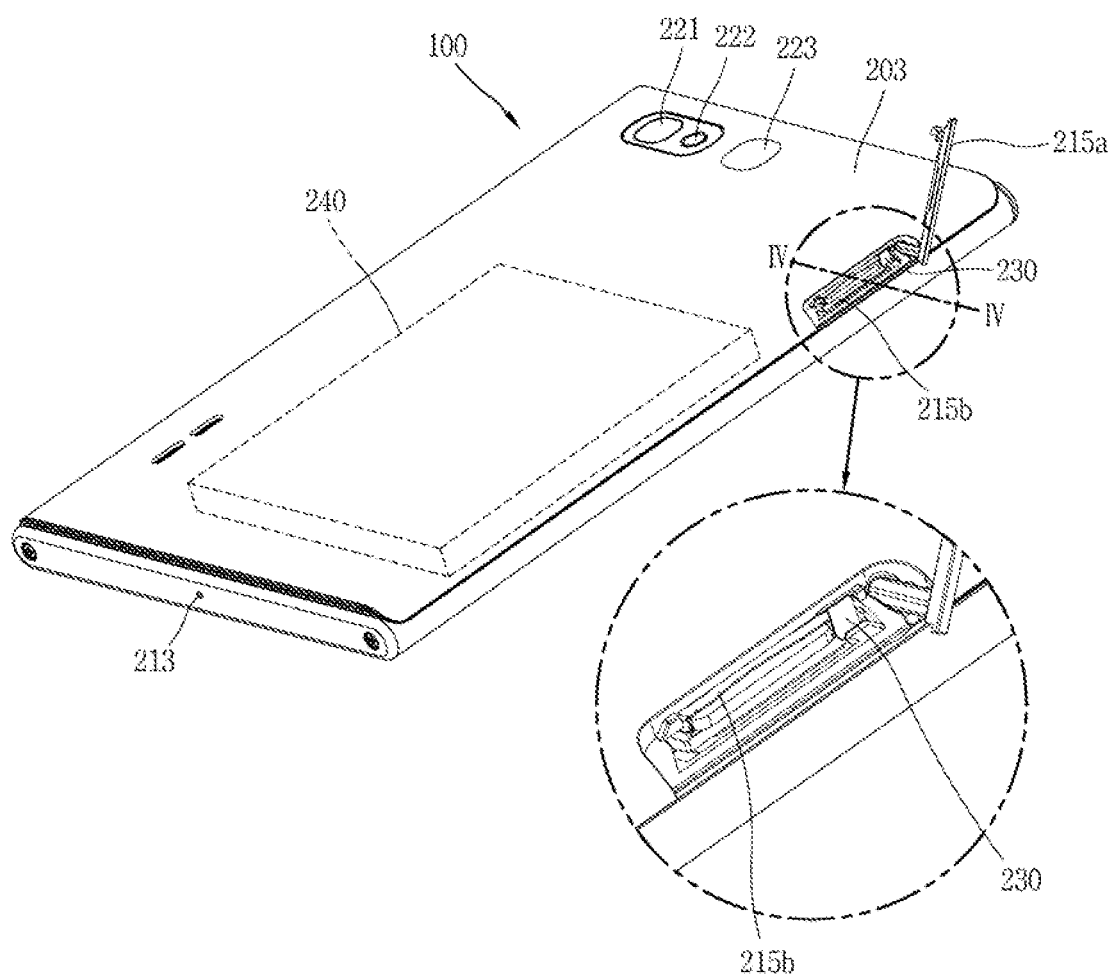

FIG. 3B is a rear perspective view of the mobile terminal illustrated in FIG. 2. The interface unit 215 may be located at one side of the mobile terminal 100. The interface unit may have a socket 215*b*. An external device 250 (see FIG. 5) may be inserted into the socket 215*b*, and a through-hole 203*a* (see FIG. 5) may be provided in the battery case 203 of the mobile terminal. A hole cover 215*a* may be connected to the battery case in order to open and/or close the through-hole.

Figure 4:
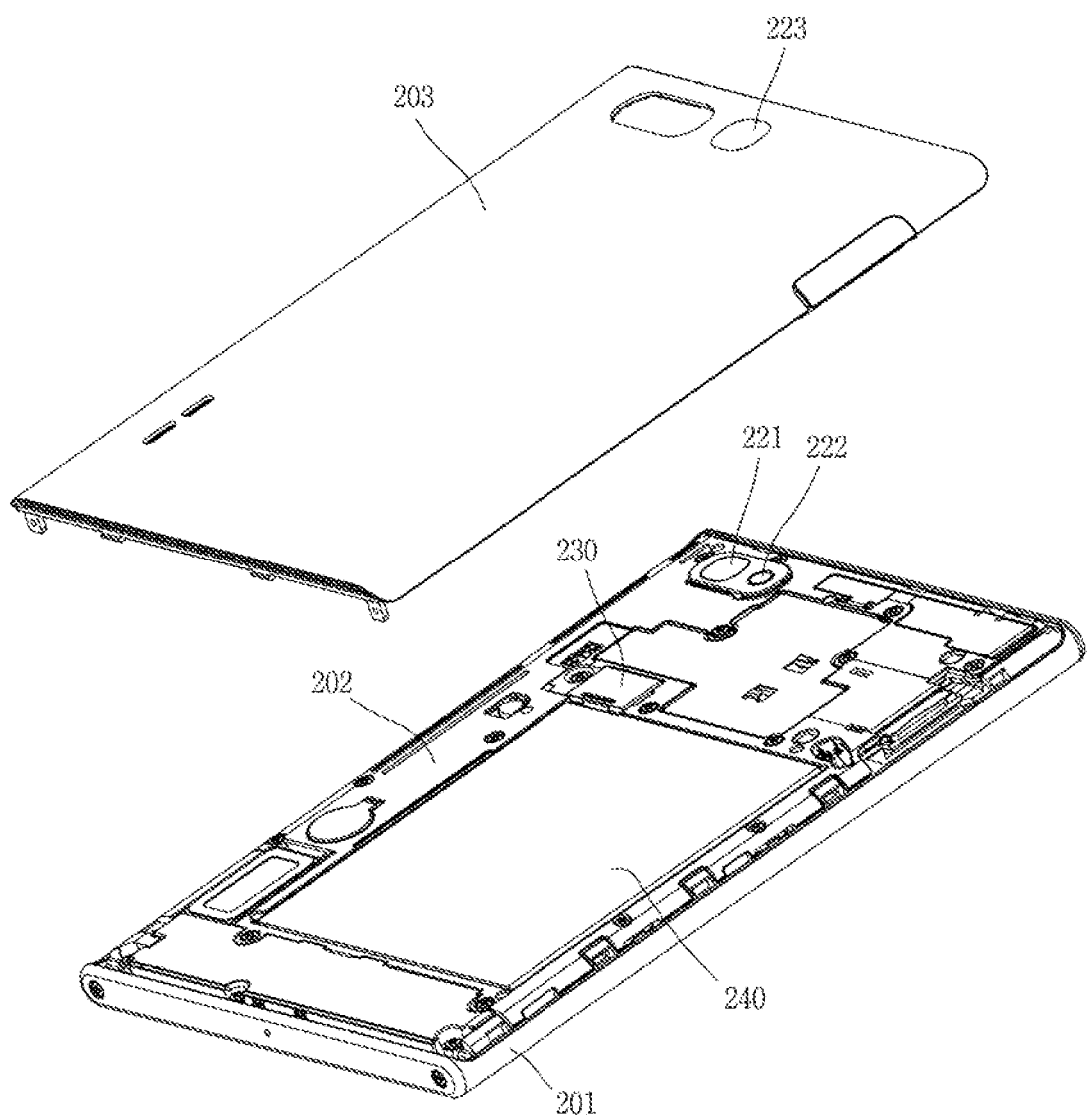
FIG. 4 is an exploded perspective view of the exemplary mobile terminal illustrated in FIG. 2.

FIG. 4 is an exploded perspective view of FIG. 2. The battery case 203 may be formed to cover a rear portion of the mobile terminal 100. The rear case 202 may be formed to cover other portions of the mobile terminal except for the battery 240. The battery may be fixed to the mobile terminal via double-faced tape or any other adhesive.

A product identification label ("PID label") is a unique label attached to a mobile terminal 100 and can be used to verify that the mobile terminal is manufactured by a particular company. The PID label may be attached at a conspicuous location so that the PID label can be seen with the naked eye when the rear case 202 of the mobile terminal is removed. The location where the PID label is attached may differ depending on the mobile terminal. A PID label may be attached onto a region of a circuit board, a main circuit board, or a mounting component, such as a SIM card, a T-flash card, a mobile station modem (MSM) chip, or a multimedia interface (MMI) connector.

An approximate size of the PID label may be 64 mm$^2$ (i.e., 8×8 mm$^2$), and an approximate area occupied by the PID label on the mobile terminal 100 may be 100 mm$^2$ (i.e., 10×10 mm$^2$).

When the battery 240 is detached from the mobile terminal 100, the PID label may be exposed. However, as shown in FIG. 4, the battery 240 may not always be detachably coupled to the mobile terminal 100. Sometimes, the battery may be fixed to the mobile terminal via double-faced tape or any other type of adhesive.

A size of the mobile terminal 100 may be increased by the area of the PID label because other components of the mobile terminal may not be able to be mounted at the area occupied by the PID label. A label plate 230 may be inserted into the mobile terminal 100 through the through-hole 203a.

Figure 5:
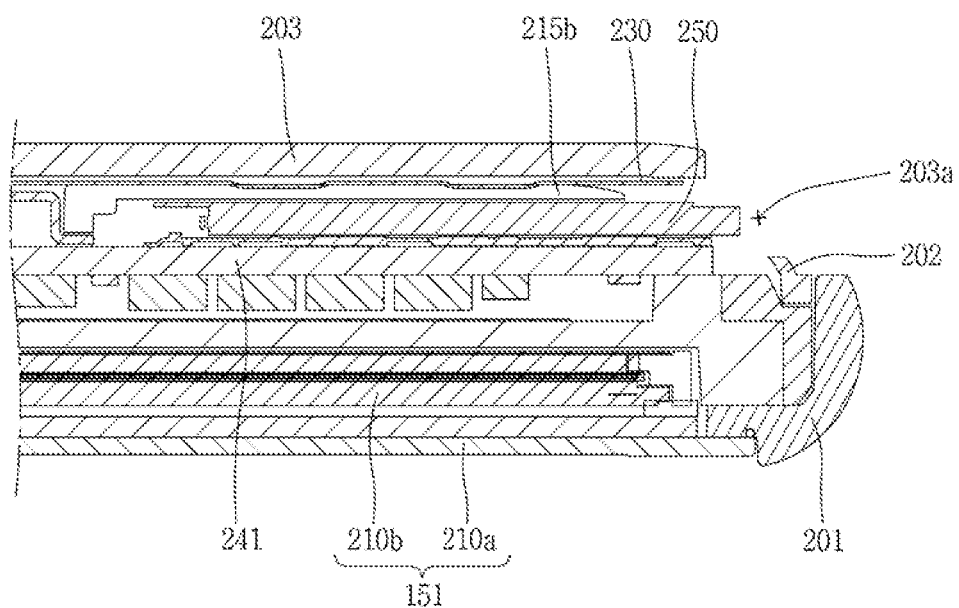
FIG. 5 is a cross-sectional view along line IV-IV of FIG. 3B.
Figure 6:
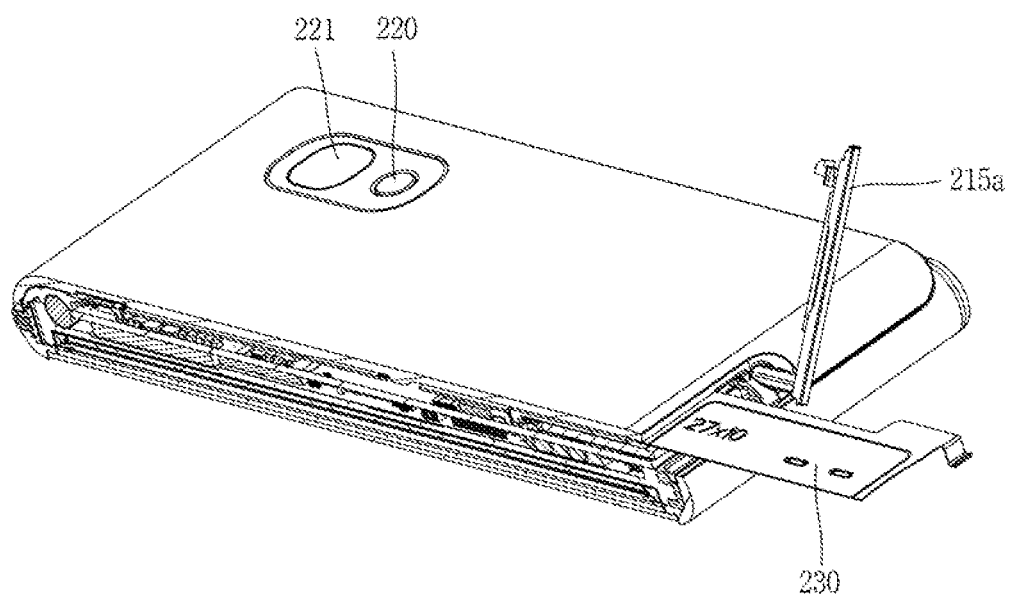
FIG. 6 is a perspective view along line IV-IV of FIG. 3B.
Figure 7:
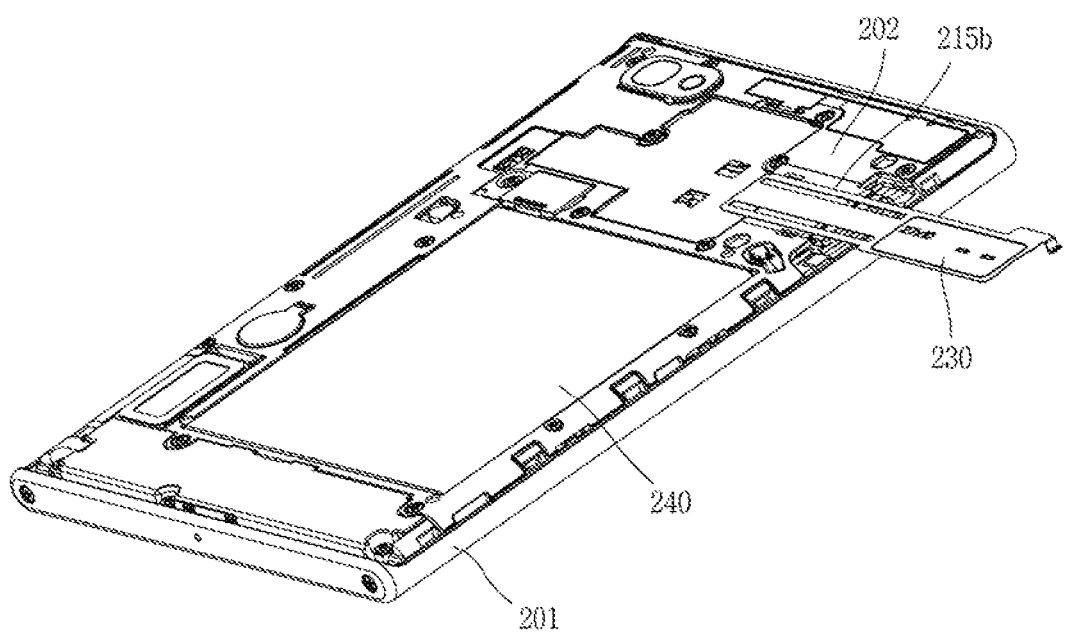
FIG. 7 is a perspective view illustrating an exemplary coupling of an exemplary label plate of a mobile terminal of the present invention.
Figure 8:
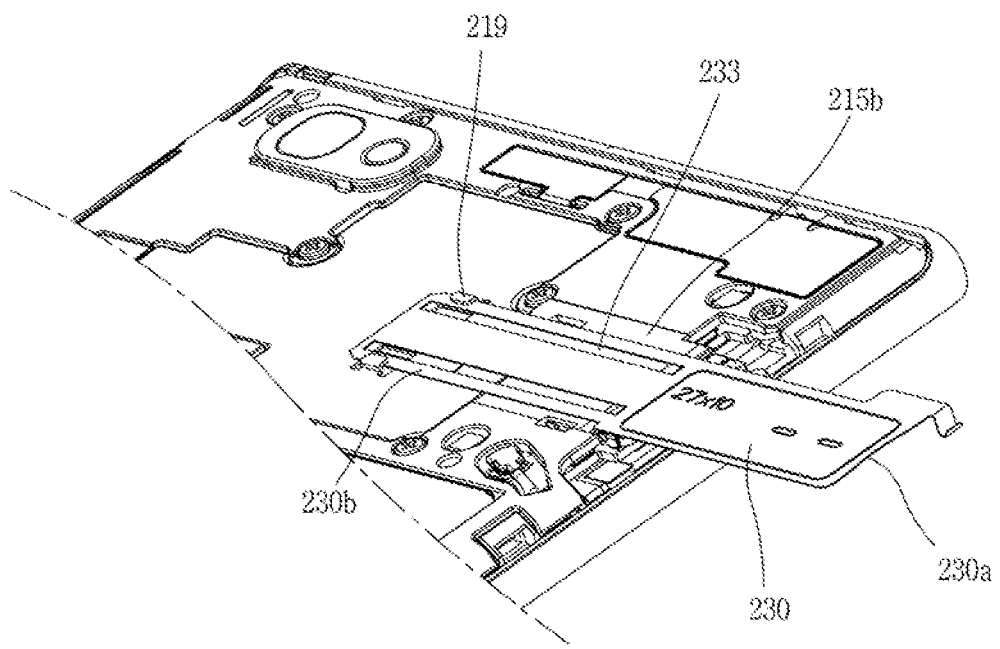
FIG. 8 is an enlarged view of a portion of FIG. 7.

The label plate will be described in detail with reference to the accompanying drawings. FIG. 5 is a cross-sectional view along line IV-IV of FIG. 3B. FIG. 6 is a perspective view along line IV-IV of FIG. 3B. FIG. 7 is a perspective view illustrating an exemplary coupling of an exemplary label plate to the mobile terminal. FIG. 8 is an enlarged view of a portion of FIG. 7.

The socket 215b of the interface unit 215 may be disposed at one side of the mobile terminal 100. An external device 250 may be inserted into an insertion hole of the socket. The socket may electrically connect to the external device and/or a circuit board 241.

The external device 250 may be a SIM card. The SIM card may be a card that can store personal information. The external device may also be a memory card (e.g., a micro-SD card), a T-flash card, a modem chip (e.g., an MSM chip), or an interface device (e.g., a port for charging, earphone or data cable, or an MMI connector), all of which may be inserted into the insertion hole of the socket 215b.

The label plate 230 may be inserted into a space formed between the upper surface of the socket 215b and the battery case 203. The label plate may slide and/or otherwise move in that space, thereby exposing and/or covering the PID label.

FIG. 8 is an enlarged view of a portion of FIG. 7. A guide portion 219 may be located on one surface of the socket 215b. There may be two or more guide portions 219 in the mobile terminal 100, and the two or more guide portions may be spaced apart from one another according to a shape of the label plate 230. As shown in FIG. 8, the guide portions may be located at ends of the label plate such that lateral movement of the label plate is limited or entirely prevented. The guide portion may be bent to cover a portion of the label plate in order to limit vertical movement of the label plate.

The bent portion of the guide portion 219 may be inserted into one or more slits 233 of the label plate 230. If the guide portion is appropriately positioned, the guide portion can limit movement of the label plate. The guide portion may hold the label plate at one end of the one or more slits while the label plate is being removed from the socket 215b. The guide portion may be formed as part of the socket or as part of the battery case 203.

Figure 9:
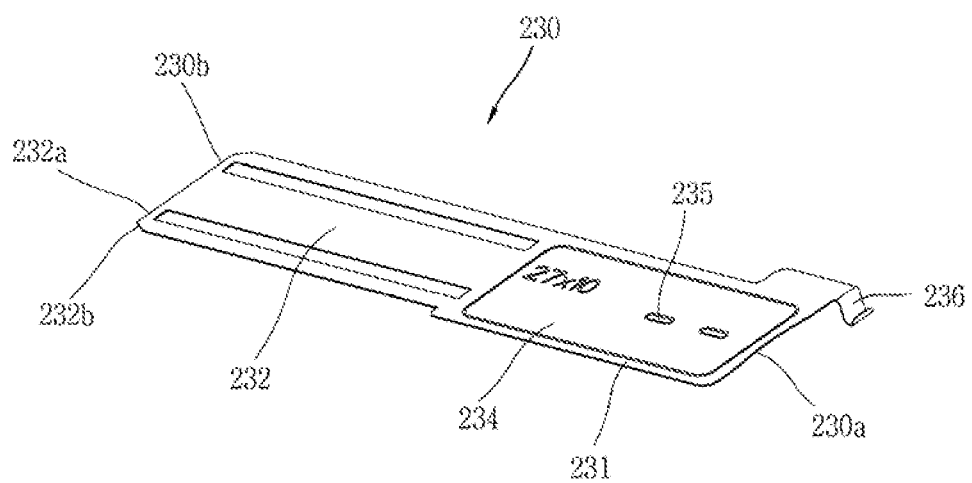
FIG. 9 is a conceptual view of an exemplary label plate of the present invention.

FIG. 9 is a conceptual view of an exemplary label plate. The label plate 230 includes a label portion 231 and a slit portion 232. A label 234 identifying a product is attached to a first part of the label portion. Projections 235 may be formed at a second part of the label portion 231. Grooves (not shown) that correspond to the projections may be formed on one surface of the socket 215b. When the projections are inserted into the grooves, movement of the label plate can be limited or entirely prevented. The projections and a support portion 203b (see FIG. 10) may also help to prevent the movement of the label plate.

The slit portion 232 may extended from the label portion 231. The slit portion 232 may be formed to have one or more slits 233.

A portion of a stopper 203d (see FIG. 10) or a portion of the guide portion 219 may be inserted into the one or more slits 233 in order to guide movement of the label plate 230. The shape or length of the one or more slits 233 may affect the limitation and/or prevention of the movement of the label plate.

The one or more slits 233 may have a predetermined length. Accordingly, the label plate 230 may be inserted into the mobile terminal 100 to the extent of the predetermined length of the one or more slits. Movement of the label plate may be limited by the stopper 203d.

The label plate 230 may have a first portion 230a and a second portion 230b. The first portion may be closest to an exterior of the mobile terminal when the label plate is inserted into the mobile terminal 100. The second portion may be located an an opposite end of the label plate relative to the first portion.

A knob portion 236 may be formed on the first portion 230a of the label plate 230. The knob portion may be bent so that the knob portion can be contacted by a user's fingernail. A user may be able to extract the label plate from the mobile terminal by pulling the knob portion using his or her fingernail.

A seam portion 232a may be formed on the second portion 230b of the label plate 230. In order to prevent damage to the mobile terminal 100 from the sliding movement of the label plate, the label plate may have the seam portion. The seam portion may be bent or folded in order to have a smooth and/or curved surface. As such, the label plate may be prevented from interfering with and/or damaging the internal structures of the mobile terminal.

A chamfer portion 232b may also be formed on the second portion 230b of the label plate 230 in order to prevent interference with the guide portion 219 during the sliding movement of the label plate. The chamfer portion may be formed by chamfering a corner of the label plate such that the corner has a predetermined curvature. The chamber portion can prevent damage to the guide portion 219.

The label plate 230 may be made from a metal plate and may also include a synthetic resin. Alternatively, the label plate may be composed entirely of a synthetic resin.

Figure 10:
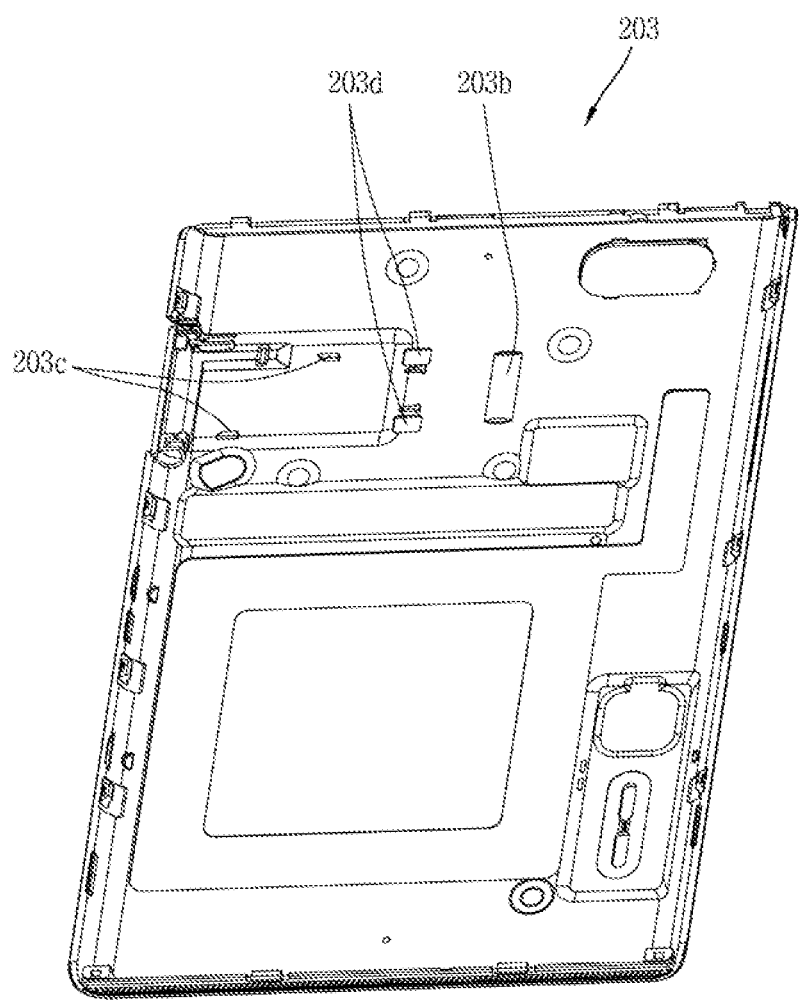
FIG. 10 is a conceptual view of an exemplary battery case of the present invention.

FIG. 10 is a conceptual view of an exemplary battery case 203. The stopper 203d and a support portion 203b may be formed in a rear portion of the battery case. The stopper may protrude from the rear portion of the battery case. The rear portion of the batter case may comprise two or more stoppers that correspond to two or more slits 233 (see FIG. 9).

The stopper 203d may be partially inserted into the one or more slits 233 (see FIG. 9) in order to limit movement of the label plate 230 according to the length of the one or more slits.

The support portion 203b prevents movement of the label plate 230 when the label plate is inserted into the mobile terminal 100. A portion of the support portion may contact the label plate and may be composed of a rubber material, thereby possibly increasing a frictional force against the label plate.

The support portion 203b may be positioned at a rear portion of the stopper 203d such that the label plate 230 can be fixed in position once the label plate has been inserted into the mobile terminal 100.

The battery case 203 may include a protruding portion 203c that protrudes from a surface of the batter case. The protruding portion and the guide portion 219 (see FIG. 8) of the socket 215b may collectively guide the movement of the label plate 230.

The protruding portions 203c may be located on the battery case 203 and configured to contact both ends of the label plate 230. The protruding portion may be inserted into a receiving groove (not shown) located on one surface of the socket 215b (see FIG. 8) or a groove (not shown) formed on the rear case 202.

A mobile terminal according to an alternative exemplary embodiment will be described below with reference to the accompanying drawings. In the alternative exemplary embodiment, descriptions of components similar to those previously described may be associated with different reference characters.

Figure 11:
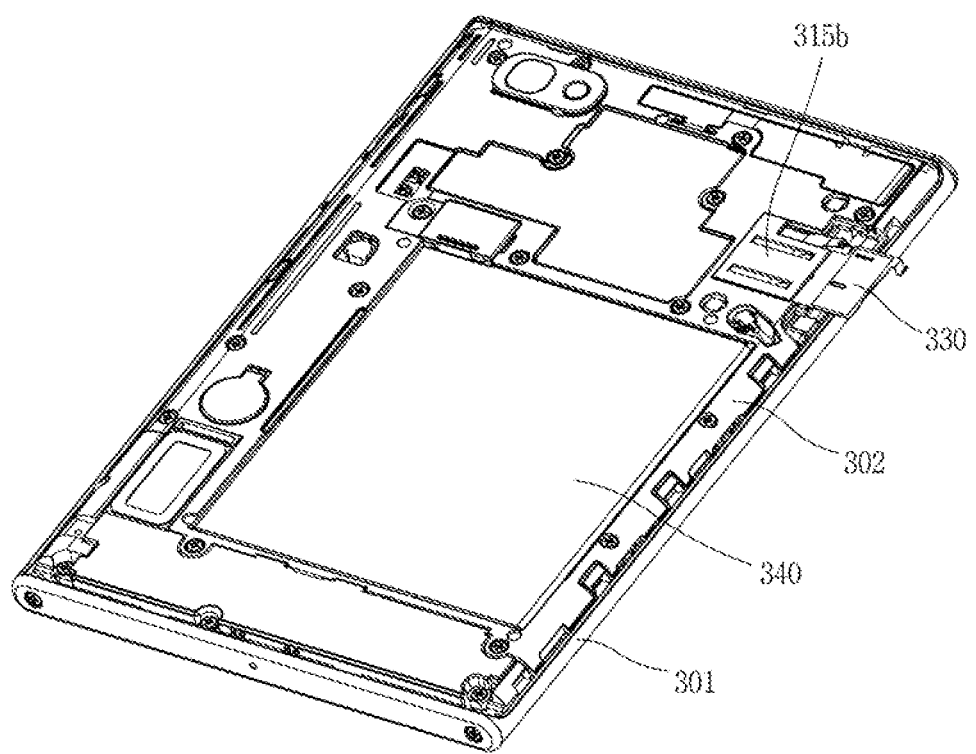
FIG. 11 is a perspective view of an alternative exemplary coupling of an alternative exemplary label plate of a mobile terminal of the present invention.
Figure 12:
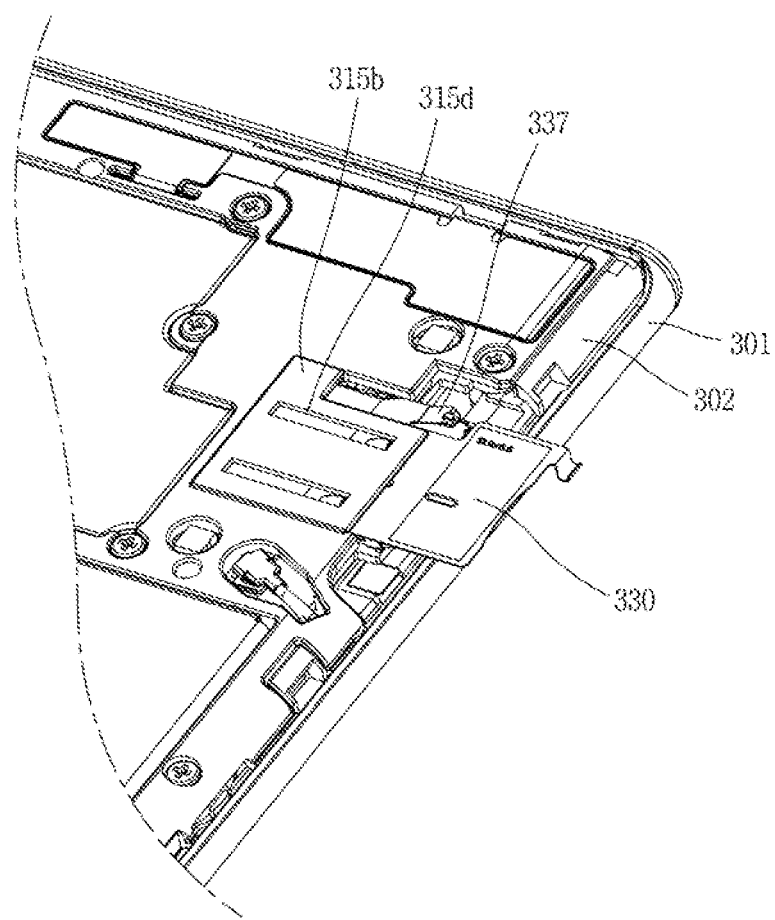
FIGS. 12 and 13 are enlarged views of a portion of FIG. 11.
Figure 13:
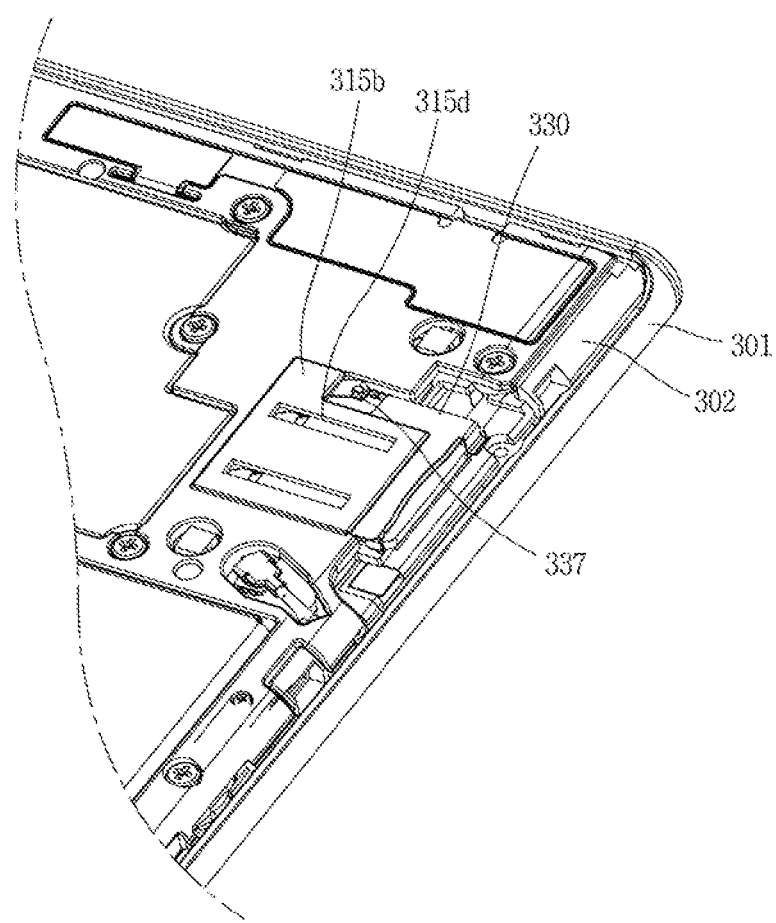
Figure 14:
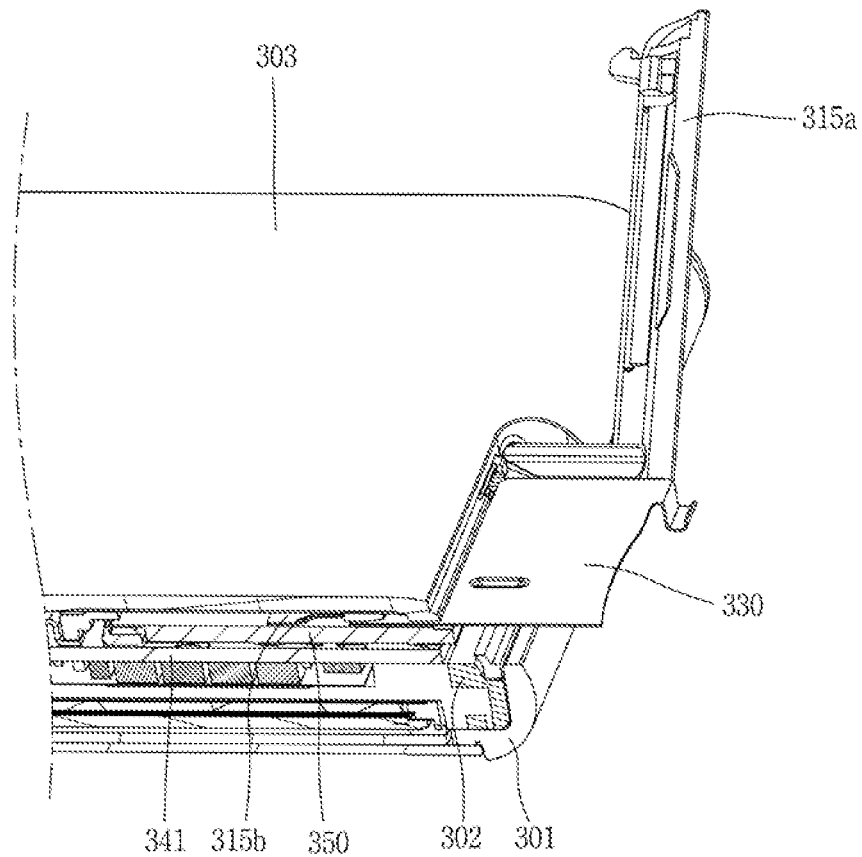
FIG. 14 is an enlarged view of a portion of FIG. 6 according to an alternative exemplary embodiment of the mobile terminal of the present invention.

FIG. 11 is a perspective view of an alternative exemplary coupling of an alternative exemplary label plate to an alternative exemplary socket. FIGS. 12 and 13 are enlarged views of a portion of FIG. 11. FIG. 14 is a perspective view taken along line IV-IV of FIG. 2 according to an alternative exemplary embodiment of the mobile terminal 100.

With respect to FIG. 14, a socket 315b may be formed on the mobile terminal 100 such that an external device 350 can be inserted into the socket. The battery case 303 may include a through-hole, and the external device may be inserted into the socket 315b through the through-hole. A hole cover 315a may be coupled to the battery case so as to open and/or close the through-hole.

The socket 315b may include a first hole and a second hole. The external device 350 may be inserted into the first hole, and the label plate 330 may be inserted into the second hole. The first and second holes may be partitioned by a partition wall. The first and second holes may be electrically insulated from each other.

One or more guide slits 315d may be formed on the socket 315b. Guide projections 338 may be formed on the label plate 330. The guide protrusions may be inserted into the one or more guide slits 315d in order to guide movement of the label plate.

Since the one or more guide slits 315d have a predetermined length, the movement of the label plate 330 may be limited according to the predetermined length of the one or more guide slits. As such, the guide projections may limit the movement of the label plate. In some embodiments, the mobile terminal 100 may comprise two or more sets of guide protrusions.

Figure 15:
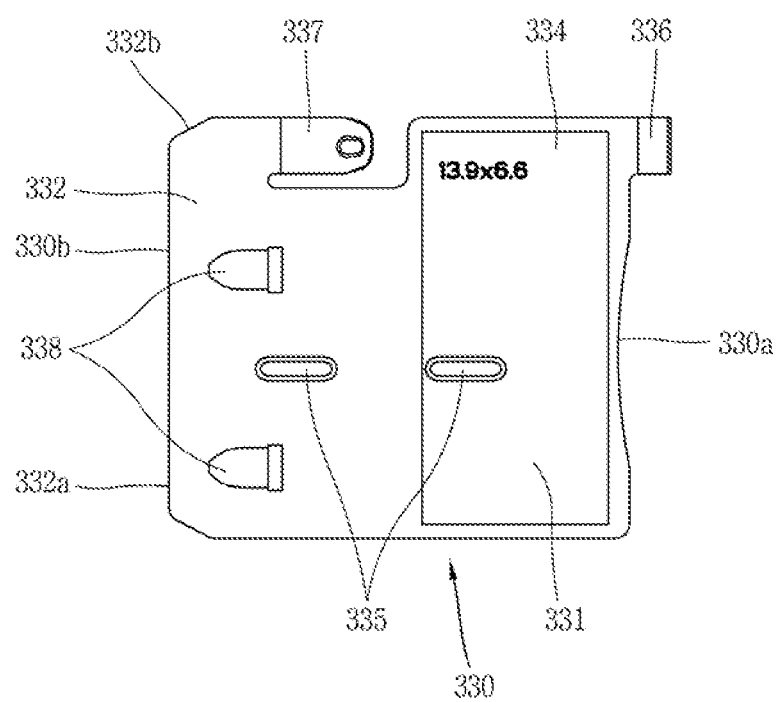
FIG. 15 is a conceptual view of an alternative exemplary label plate of the present invention.

FIG. 15 is a conceptual view of an alternative exemplary label plate 330. The label plate may include a label portion 331 and an extending portion 332. A label 334 for identifying a product is attached to a first portion of the label portion of the label plate. Projections 335 may be formed on a second portion of the label portion. Grooves (not shown) may be formed in the socket 315b and may correspond to the projections on the label portion. When the projections are inserted into the grooves, the movement of the label plate may be limited or entirely prevented.

The extending portion 332 may include the guide projections 338. The guide projections may protrude from one surface of the label plate 330 and guide the insertion of the label plate into the one or more guide slits 315d of the socket 315b. As such, the guide projections can guide the movement of the label plate.

The label plate 330 may have a first portion 330a and a second portion 330b. The first portion may be closes to an exterior of the mobile terminal when the label plate is inserted into the mobile terminal 100. The second portion may be located at an opposite side of the label plate relative to the first portion.

A knob portion 336 may be formed on the first portion of the label plate 330. The knob portion may be bent such that the knob portion can be contacted by a user's fingernail. A user may be able to extract the label plate from the mobile terminal 100 by pulling the knob portion with his or her fingernail.

In order to prevent damage to the mobile terminal 100 from the sliding movement of the label plate, the label plate may have a seam portion 332a. The seam portion may be formed on the second portion of the label plate 330. The seam portion may be bent or folded in order to have a smooth and/or curved surface. As such, the label plate may be prevented from interfering with and/or damaging the internal structures of the mobile terminal.

A stopper 337 may be formed at a side other than the first and second sides of the label plate 330. The stopper may be formed on the label plate. The stopper may be configured to stop movement of the label plate once the stopper is inserted into an opening of the socket 315b. A protruding portion of the stopper may contact the opening of the socket 315b, thereby limiting or prevent further movement by the label plate.

Figure 16:
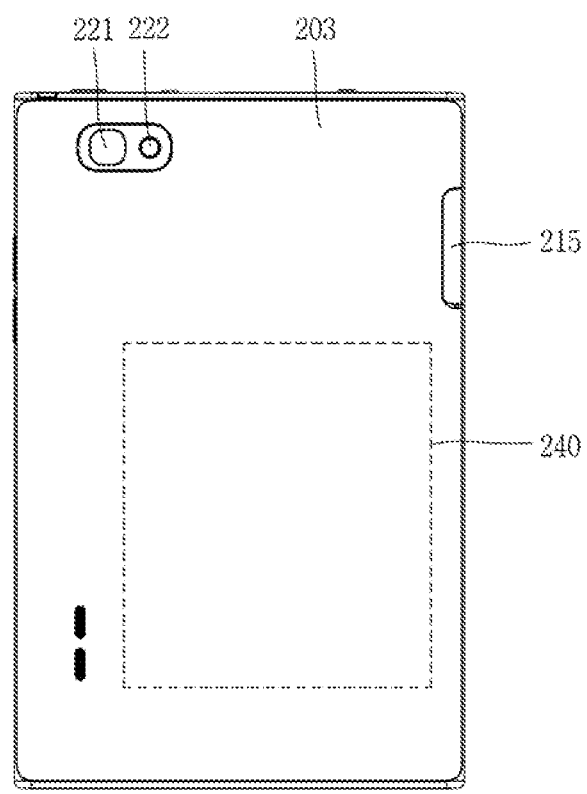
FIGS. 16 and 17 are different perspective views of the exemplary mobile terminal illustrated in FIG. 2.
Figure 17:
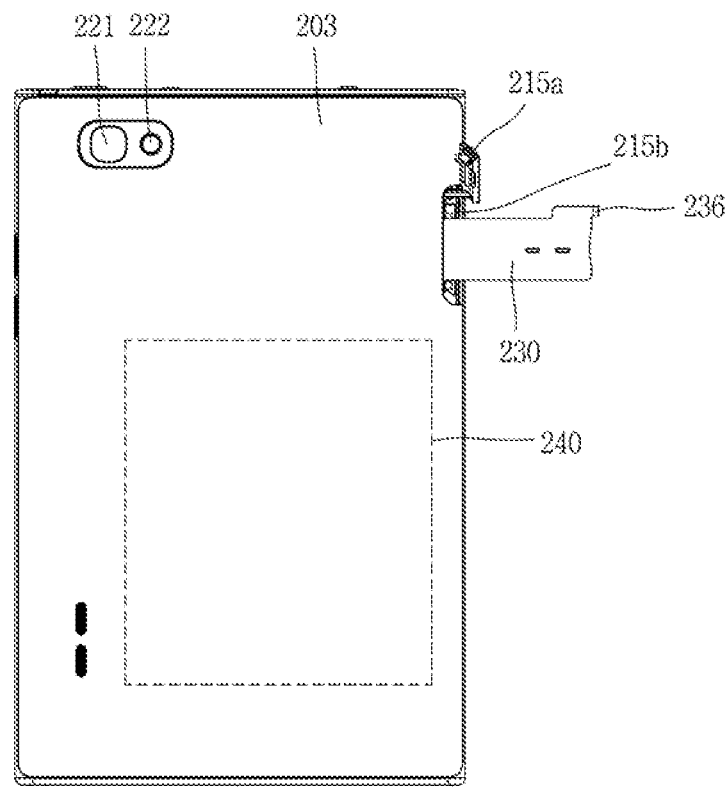

FIGS. 16 and 17 are different perspective views of the exemplary mobile terminal 100 illustrated in FIG. 2. In order to identify a PID label of the mobile terminal, the user can remove the hole cover 215a and extract the label plate 230 (see FIG. 6). As such, the user can identify the PID label of the mobile terminal without disassembling the entire mobile terminal.

The foregoing embodiments and advantages are merely exemplary and are not to be construed as limiting the scope of the claims. The disclosure herein can be readily applied to other devices. The foregoing description is intended to be illustrative and not to limit the scope of the claims. The features, structures, methods, and other characteristics of the exemplary embodiments described herein may be combined in various ways to obtain additional and/or alternative exemplary embodiments without deviating from the scope of the claims. The foregoing features may be embodied in several forms and it will be understood by one of ordinary skill in the art that the above-described embodiments are not intended to limit the scope of the claims. The claims are to be construed as broadly as possible. Changes and/or modifications that fall within the metes and bounds of the claims, or equivalents of such metes and bounds, are intended to be encompassed within the scope of the claims.

What is claimed is:

1. A mobile terminal comprising:
   a body comprising a socket configured to receive an external device;
   a case that covers the body; and
   a label plate configured to slide in and out of a space located between the socket and the case and comprising a label, the label located on one surface of the label plate and containing identification information about a product,
   wherein the label is exposed when the label plate slides out of the space,
   wherein the label plate further comprises:
   a label portion that comprises the label on a first portion of the label portion; and
   a slit portion that extends from the label portion and has at least one slit.

2. The mobile terminal of claim 1, wherein:
   the socket comprises an insertion hole through which the external device is inserted; and
   the case comprises a through-hole corresponding to the insertion hole of the socket.

3. The mobile terminal of claim 1, wherein:
   the socket comprises a guide portion formed on a surface of the socket; and the guide portion is configured to guide movement of the label plate as the label plate slides in and out of the space.

4. The mobile terminal of claim 3, wherein the guide portion is bent such that a portion of the guide portion extends toward the slit portion.

5. The mobile terminal of claim 1, wherein the case comprises a stopper that protrudes toward the slit portion.

6. The mobile terminal of claim 1, wherein the slit portion comprises a pair of slits.

7. The mobile terminal of claim 1, wherein the case comprises a support portion that is configured to limit movement of the label plate by pressing against the slit portion as the label plate slides in and out of the space.

8. The mobile terminal of claim 7, wherein a portion of the support portion that presses against the slit portion is composed of a rubber material.

9. The mobile terminal of claim 1, wherein:
the label portion further comprises projections that protrude from the label portion, the projections located on a second portion of the label portion; and
the socket comprises grooves into which the projections are inserted.

10. The mobile terminal of claim 1, wherein:
the label plate further comprises:
a first portion that is closest to an exterior of the mobile terminal when the label plate is slid in the space, and
a second portion that is located on an opposite side of the label plate relative to the first portion; and
a knob portion is formed on the first portion of the label plate and configured to facilitate sliding the label plate out of the space.

11. The mobile terminal of claim 10, further comprising:
a seam portion that has one folded end, is located at the second portion of the label plate, and is configured to prevent interference with an internal structure of the mobile terminal as the label plate slides in and out of the space.

12. The mobile terminal of claim 3, further comprising:
a chamfer portion located on a second portion of the label plate and is configured to prevent interference with the guide portion as the label plate slides in and out of the space.

13. The mobile terminal of claim 1, wherein the external device is a subscriber identity module (SIM) card.

14. The mobile terminal of claim 1, wherein the case comprises a protruding portion that protrudes from a surface of the case and is configured to guide the label plate as the label plate slides in and out of the space.

15. A mobile terminal comprising:
a body comprising a socket that is formed on one side of the body and configured to receive an external device;
a case that covers the one side of the body and comprising a through-hole through which the socket is exposed; and
a label plate configured to slide in and out of a space located between the socket and the case and comprising a label, the label plate comprising a label that is located on a surface of the label plate and contains identification information about a product,
wherein the mobile terminal is in a first state when the label plate is not inserted in the through-hole and the label is exposed,
wherein the mobile terminal is in a second state when the label plate is inserted in the through-hole and the label is covered, and
wherein the socket comprises a first hole into which the external device is inserted, a second hole into which the label plate is inserted, and at least one guide slit that is configured to guide the label plate as the label plate is inserted into the second hole.

16. The mobile terminal of claim 15, further comprising a hole cover that is coupled to the case and configured to open and close the through-hole of the case.

17. The mobile terminal of claim 15, wherein the label plate further comprises:
a label portion that comprises the label and is located on a surface of the label plate; and
an extending portion that extends from the label portion and comprises a guide projection that is configured to couple to the at least one guide slit.

18. The mobile terminal of claim 17, wherein the label plate further comprises a stopper that protrudes from the label plate and is configured to insert into an opening of the socket in order to stop movement of the inserted label plate.

* * * * *